United States Patent [19]
Rourke et al.

[11] Patent Number: 5,119,206
[45] Date of Patent: Jun. 2, 1992

[54] SYSTEM FOR PRINTING BOUND DOCUMENTS

[75] Inventors: John L. Rourke, Fairport; Kurt T. Knodt, Rochester; Herbert J. Raymor, Holcomb; Gerald L. Coy, Rochester; James R. Graves, Ontario; Filomena K. U, Fairport; David E. Crocker, Fairport; Paul J. Valliere, Fairport; Jack F. Ratcliffe, II, Pittsford, all of N.Y.

[73] Assignee: Xerox Corporation, Stamford, Conn.

[21] Appl. No.: 589,944

[22] Filed: Sep. 28, 1990

[51] Int. Cl.⁵ .................. H04N 1/04; H04N 1/23
[52] U.S. Cl. .......................... 358/296; 358/450; 358/452; 358/453; 358/401
[58] Field of Search ............ 358/401, 296, 300, 450, 358/452, 453, 444; 355/230, 25, 75, 244, 218, 311

[56] References Cited

U.S. PATENT DOCUMENTS

| | | | |
|---|---|---|---|
| 4,332,464 | 6/1982 | Bartulis et al. | 355/311 |
| 4,616,269 | 10/1986 | Mori | 358/450 |
| 4,631,599 | 12/1986 | Cawkell | 358/300 |
| 4,659,207 | 4/1987 | Maekawa | 355/25 |
| 4,688,930 | 8/1987 | Ohno | 355/25 |
| 4,716,439 | 12/1987 | Acquaviva | 355/25 |
| 4,739,372 | 4/1988 | Watanabe | 355/25 |
| 4,825,250 | 4/1989 | Miyata et al. | 355/218 |
| 4,831,413 | 5/1989 | Hamakawa | 355/244 |
| 4,903,077 | 2/1990 | Oushiden et al. | 355/244 |
| 4,912,504 | 3/1990 | Ito et al. | 355/25 |
| 5,001,574 | 3/1991 | Shimizu | 358/450 |

Primary Examiner—Benjamin R. Fuller
Assistant Examiner—Scott A. Rogers
Attorney, Agent, or Firm—Frederick E. McMullen

[57] ABSTRACT

An electronic printing system for printing bound documents such as books in which the pages of the document are placed face down in registered position on the platen of a scanner programmed to scan either or both sides of the page and provide image signals representative of the image scanned, and a printer programmable to either print both sides of a page on a common print media sheet or on separate print media sheets.

6 Claims, 15 Drawing Sheets

SYSTEM FOR PRINTING BOUND DOCUMENTS

The invention relates to electronic printers and printing systems, and more particularly, to a system for printing bound documents such as books.

Future electronic printers and printing systems are intended to provide the operator or user with as many job programming options and selections as reasonably possible. One desired option answers the need that sometimes makes it necessary or desirable to make copies or prints of bound documents such as books. As can be understood, documents of this type are difficult to handle and this difficulty is exacerbated in situations where each side of each page of a book, for example, is to be copied, entailing repeated manual positioning, registering, and removing of the book onto and off of a scanning platen. While as indicated below, the prior art has provided various ways to enable copying of bound documents, these appear to have been limited to light/lens copiers in which the page to be copied is scanned and a light image obtained to expose a photoreceptor. Notwithstanding attempts to improve efficiency of these copiers, there still remains the need to repeatedly handle the bound document being copied, especially in the case where it is desired to pre-collate the copy job.

In the prior art, U.S. Pat. No. 4,903,077 to Oushiden et al discloses an electronic copying apparatus in which chosen portions of a document can be trimmed, while U.S. Pat. No. 4,825,250 to Miyata et al discloses an image forming apparatus which allows both trimming for erasing unwanted portions of an image and a masking function to prevent selected areas of the image from being copied. U.S. Pat. No. 4,659,207 to Maekawa discloses a copier designed to independently scan two parts of a document original with the ability to produce copies on both dies of a copy sheet or on different copy sheets. U.S. Pat. No. 4,912,504 to Ito et al discloses a copier which scans two documents aligned with a pair of reference edges on a platen with copy processing operations designed to accommodate the fact that the second documents is on the downstream scanning side. U.S. Pat. No. 4,688,930 to Ohno discloses a copying apparatus which in a first mode scans a first area of a document with the second area automatically scanned afterward, and in a second mode reverses the scan cycle to scan the second area of the document first followed by the first area. U.S. Pat. No. 4,716,439 to Acquaviva discloses a half-mode copier for books in which, during the first scan, one-half of the electrostatic image is erased to produce a copy of one side and during the next cycle, the other half of the electrostatic image is erased to produce a copy of the other side. And, U.S. Pat. No. 4,739,372 to Watanabe, discloses an image forming apparatus that provides dual-page copies of a document free of offset, the apparatus using a fixed start position for the first page and a movable scale to predict an end of scan for the second page, while U.S. Pat. No. 4,332,464 to Bartulis et al discloses an interactive user interface for copiers.

In contrast, the present invention provides a process for printing a bound document in a printing system having a scanner with platen for scanning documents placed on the platen and converting the documents to image signals and a printer for producing prints of the document image from the image signals, the pages of the bound document having two discrete image sides with a foldline therebetween, comprising the steps of: programming the scanner to scan one or both of the image sides of the bound document pages; placing the bound document with a page to be printed on the platen; using the foldline to register the page on the platen for scanning; actuating the scanner to scan the page and provide image signals representative of the image side or sides scanned; storing the image signals; repeating the above for each additional page of the bound document to be printed; for printing, inputting the image signals representative of one or both of the bound document image sides from the memory to the printer; actuating the printer to produce a print of the bound document; and repeating printing until the desired number of prints of the bound document are made.

IN THE DRAWINGS

Figure 1:
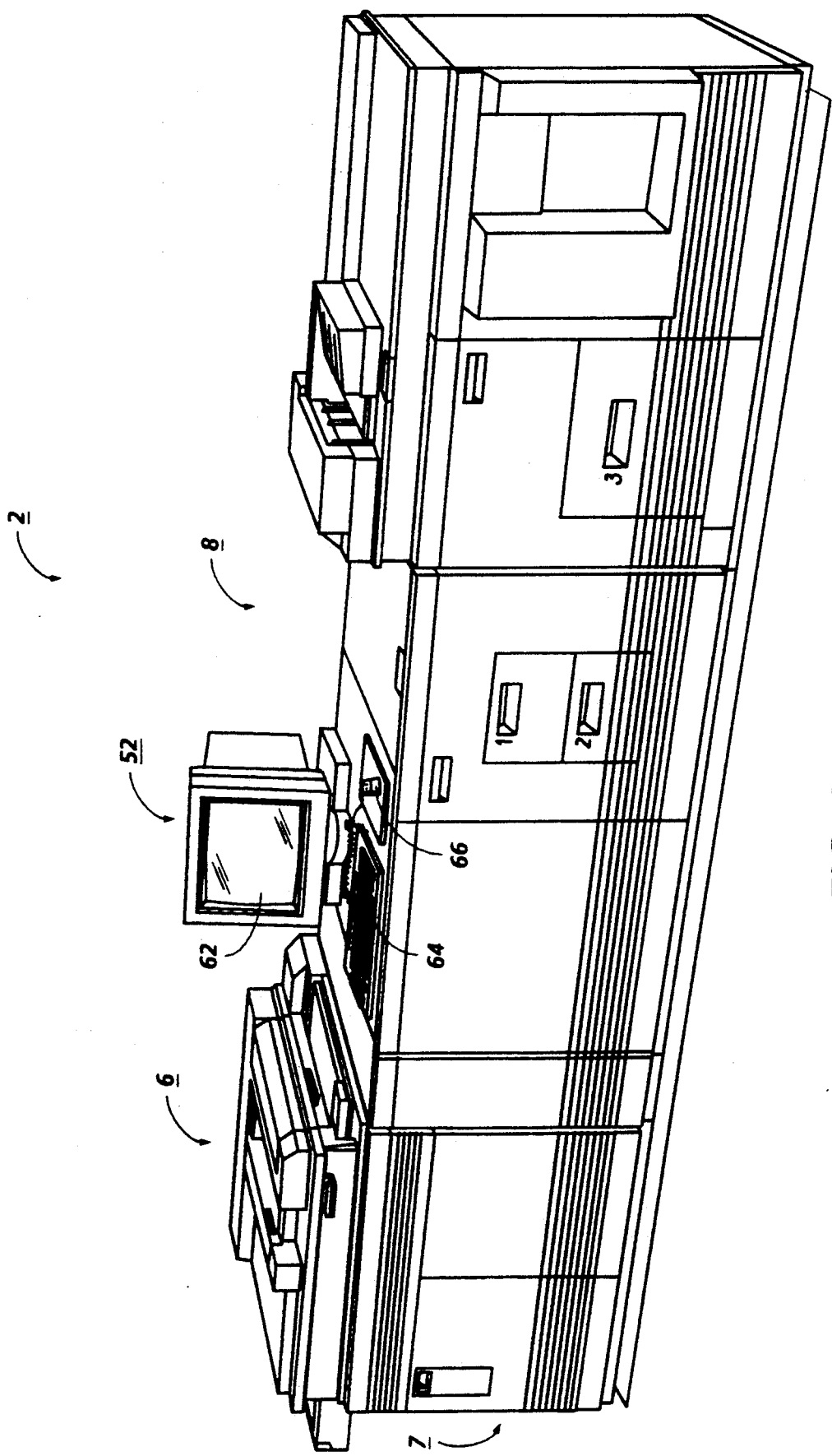
FIG. 1 is a view depicting an electronic printing system incorporating the bound document printing system of the present invention.
Figure 5A:
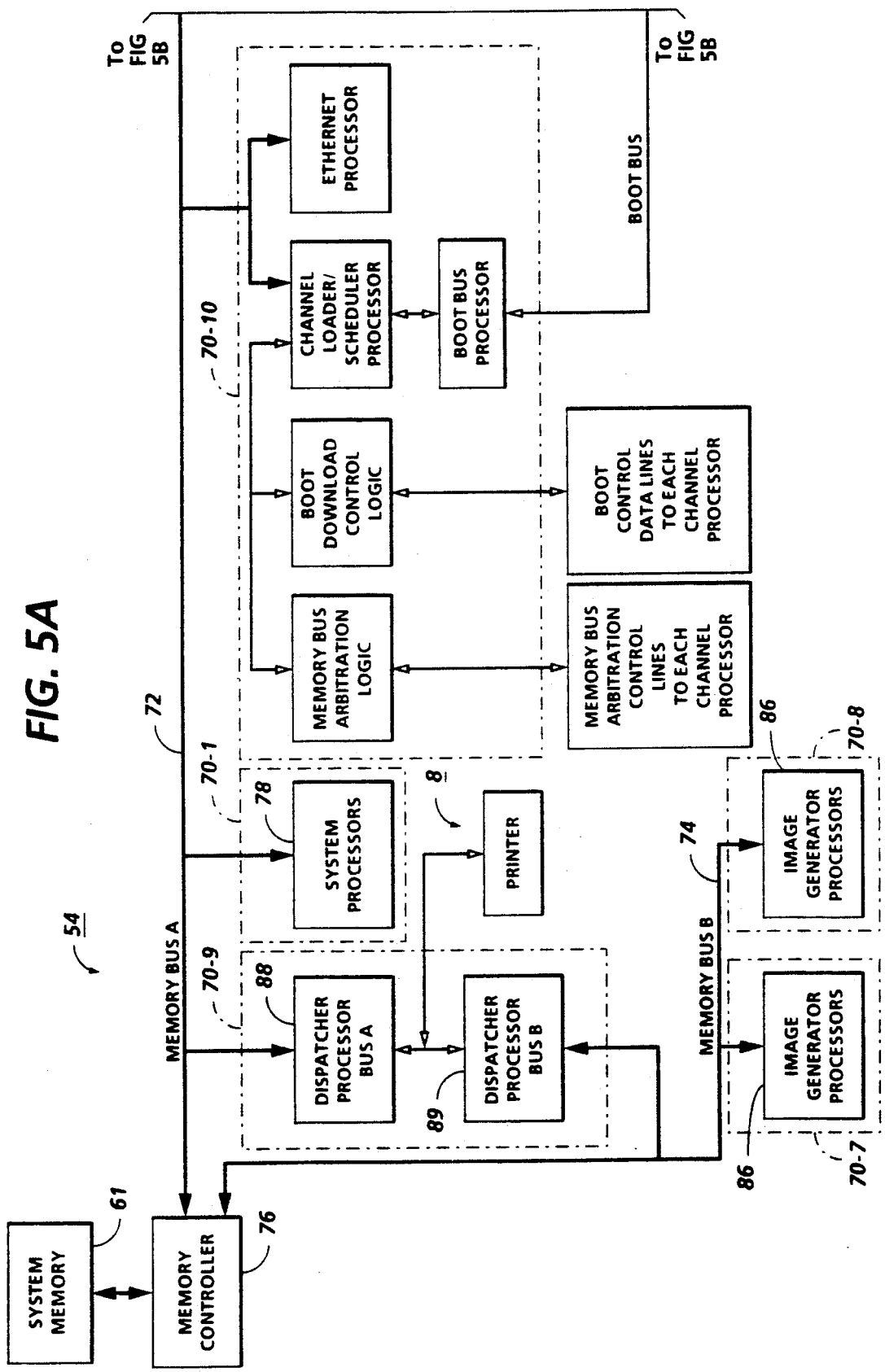
Figure 5B:
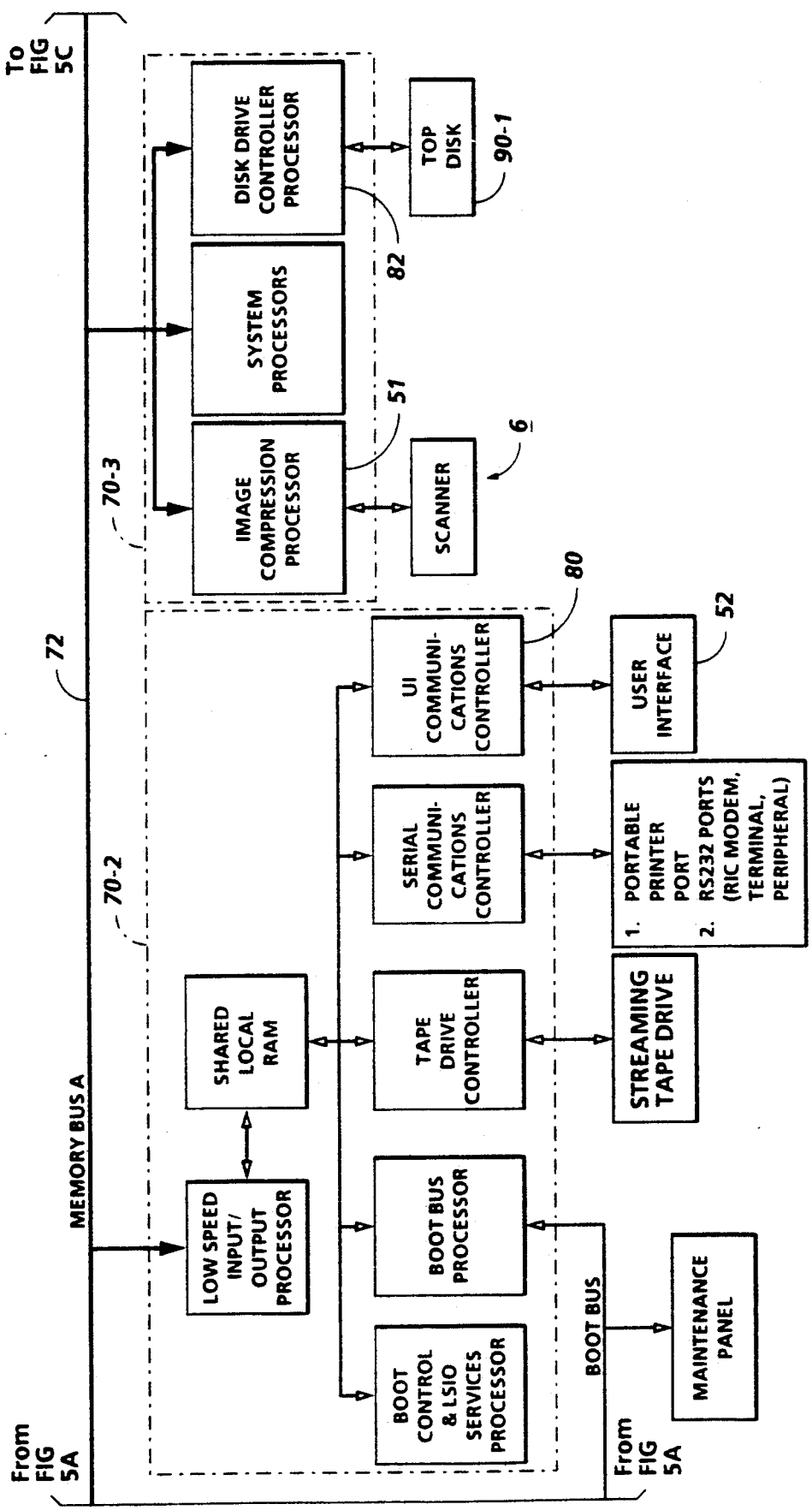
Figure 5C:
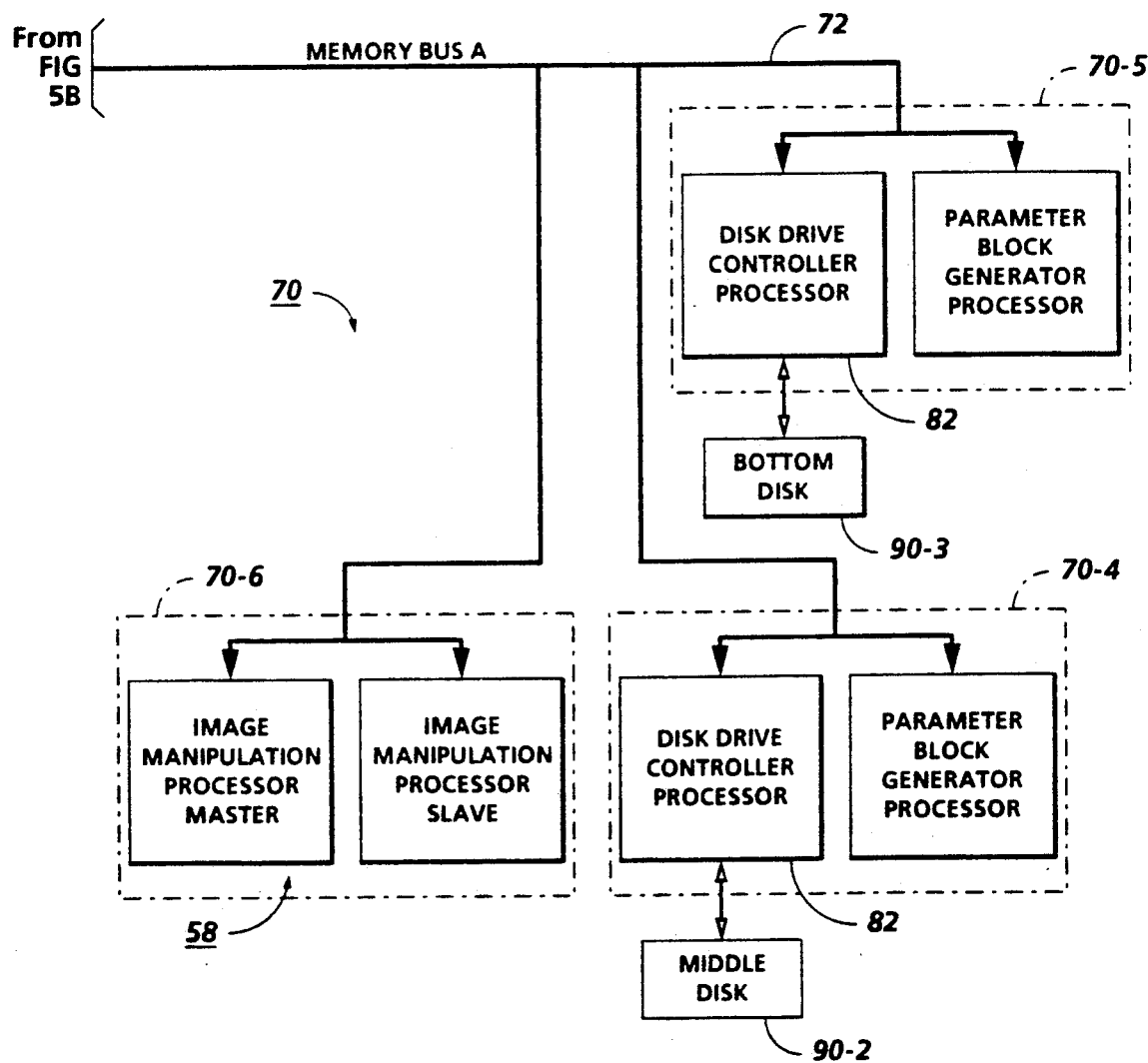
Figure 6:
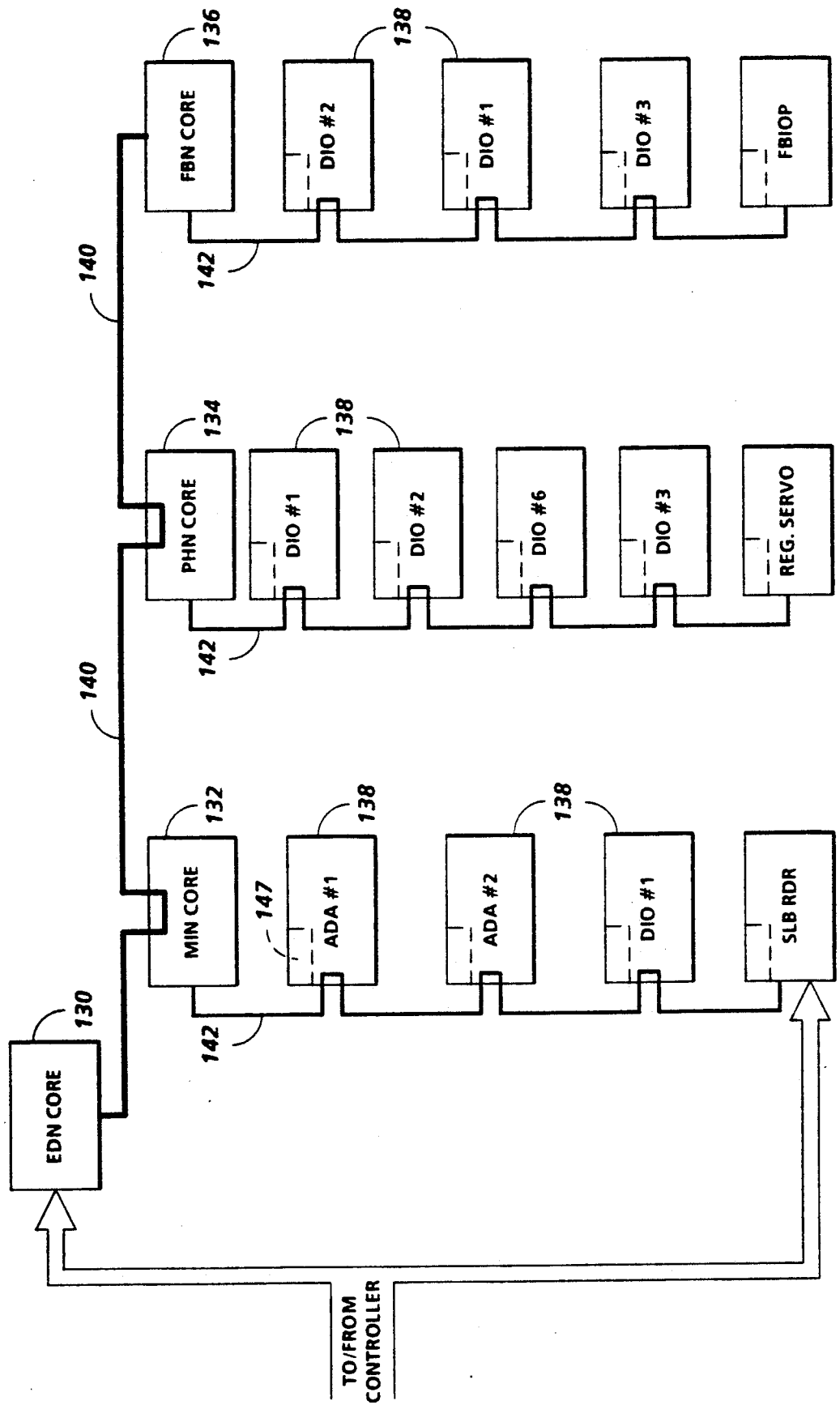
Figure 7:
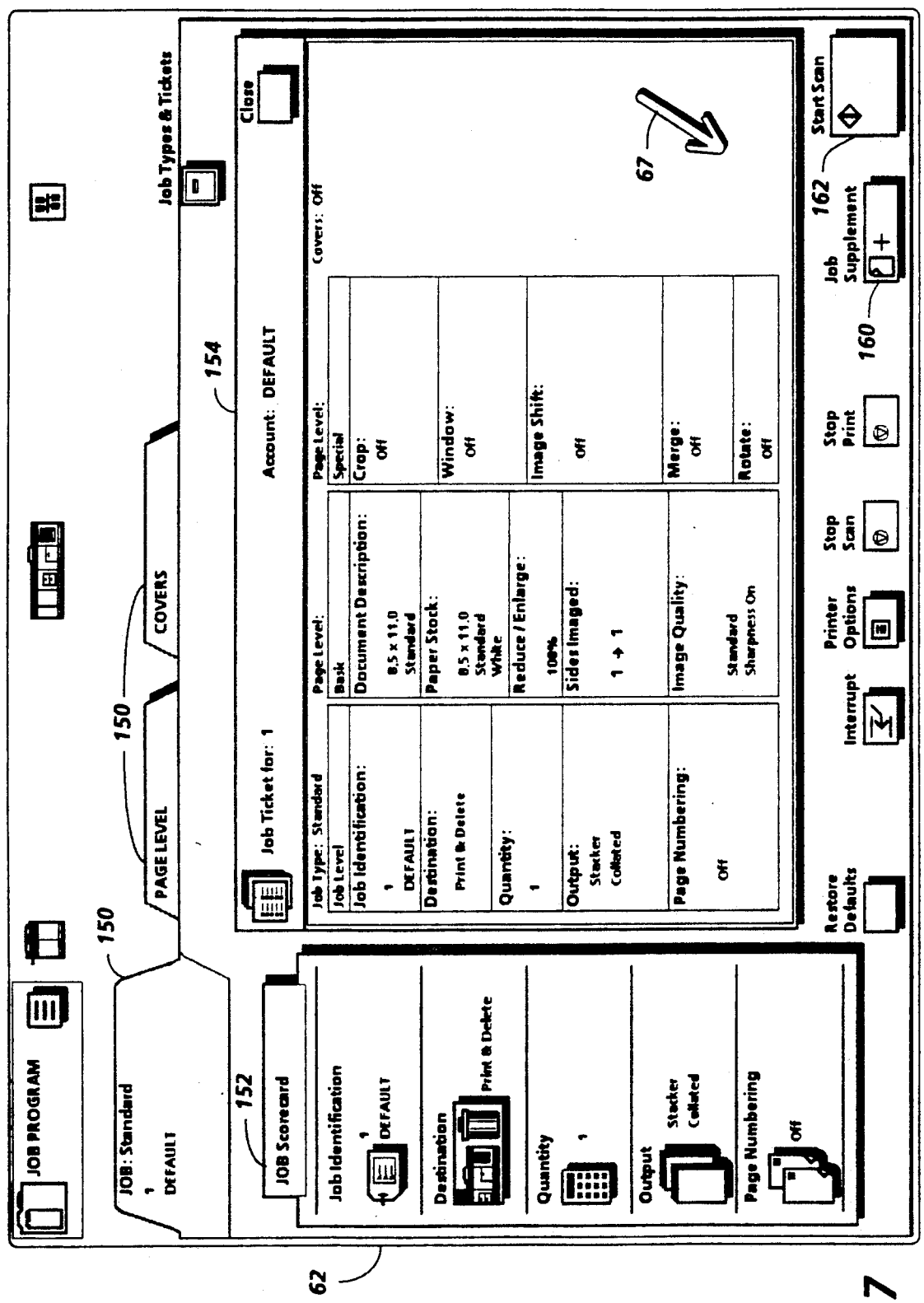
Figure 8:
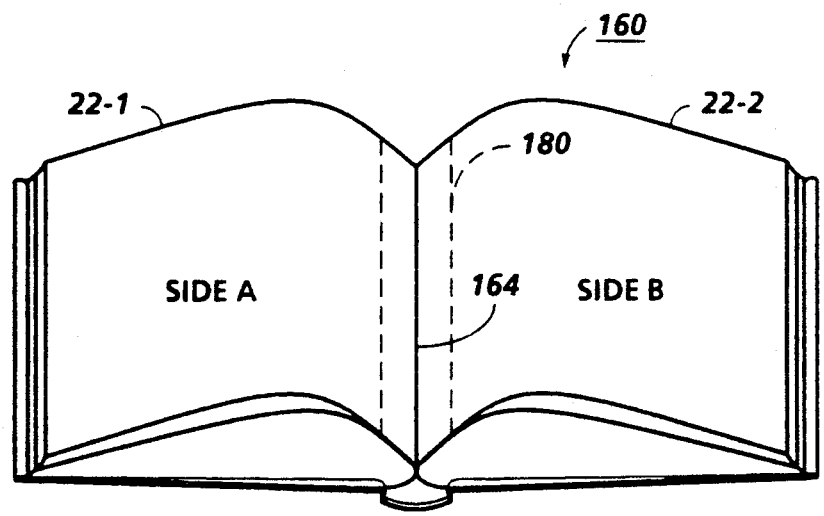
Figure 9:
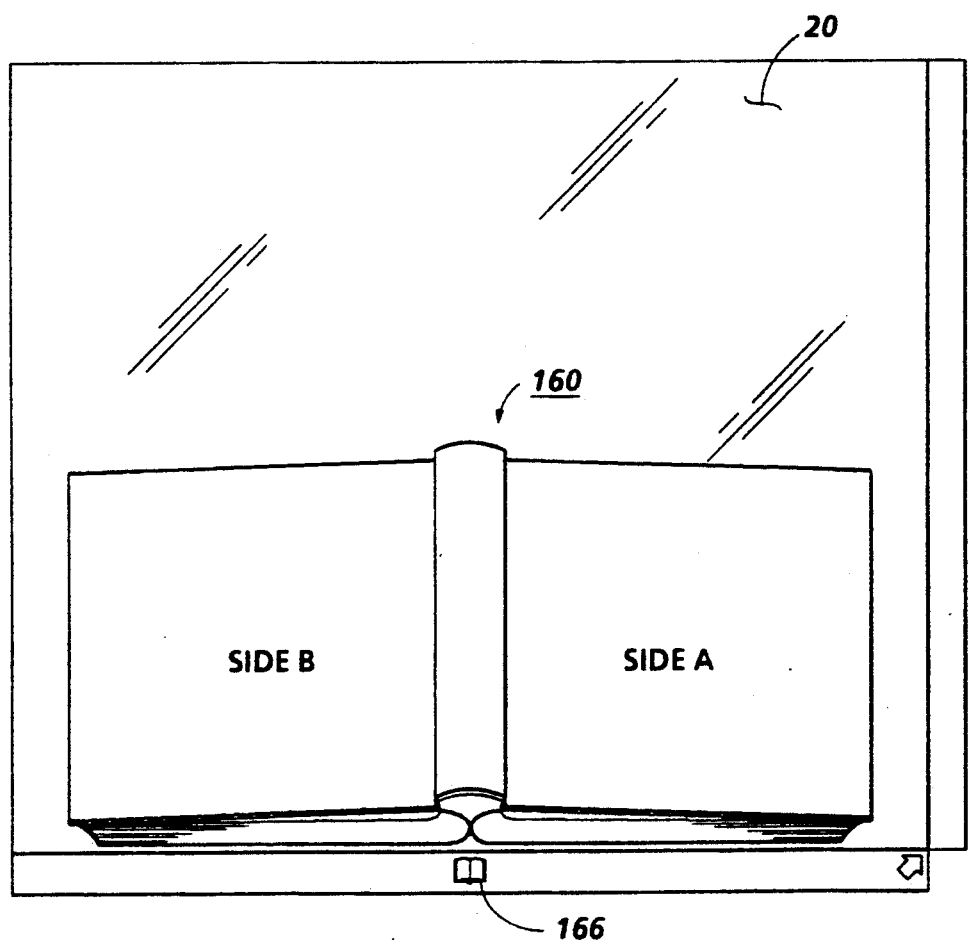
Figure 10:
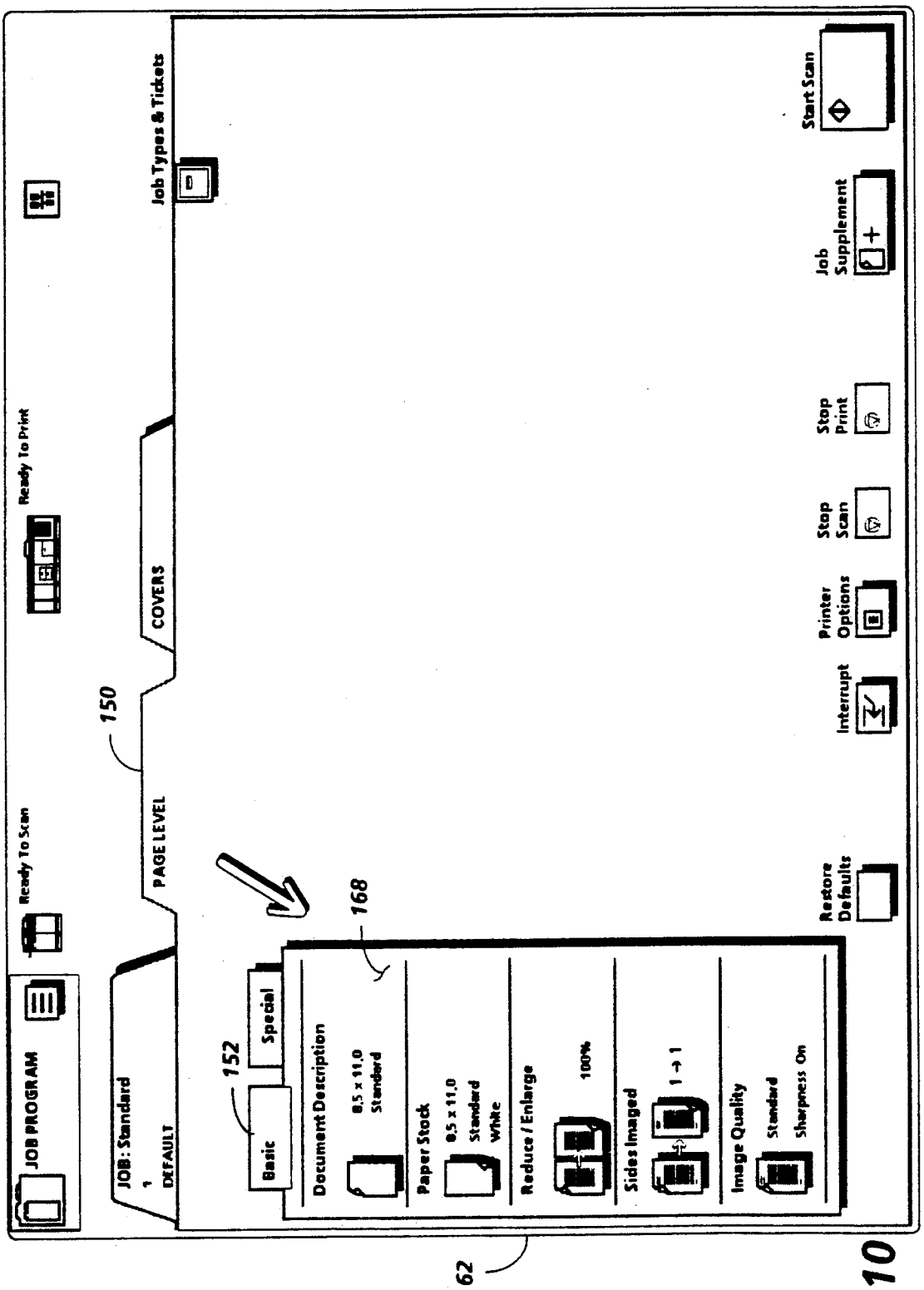
Figure 11:
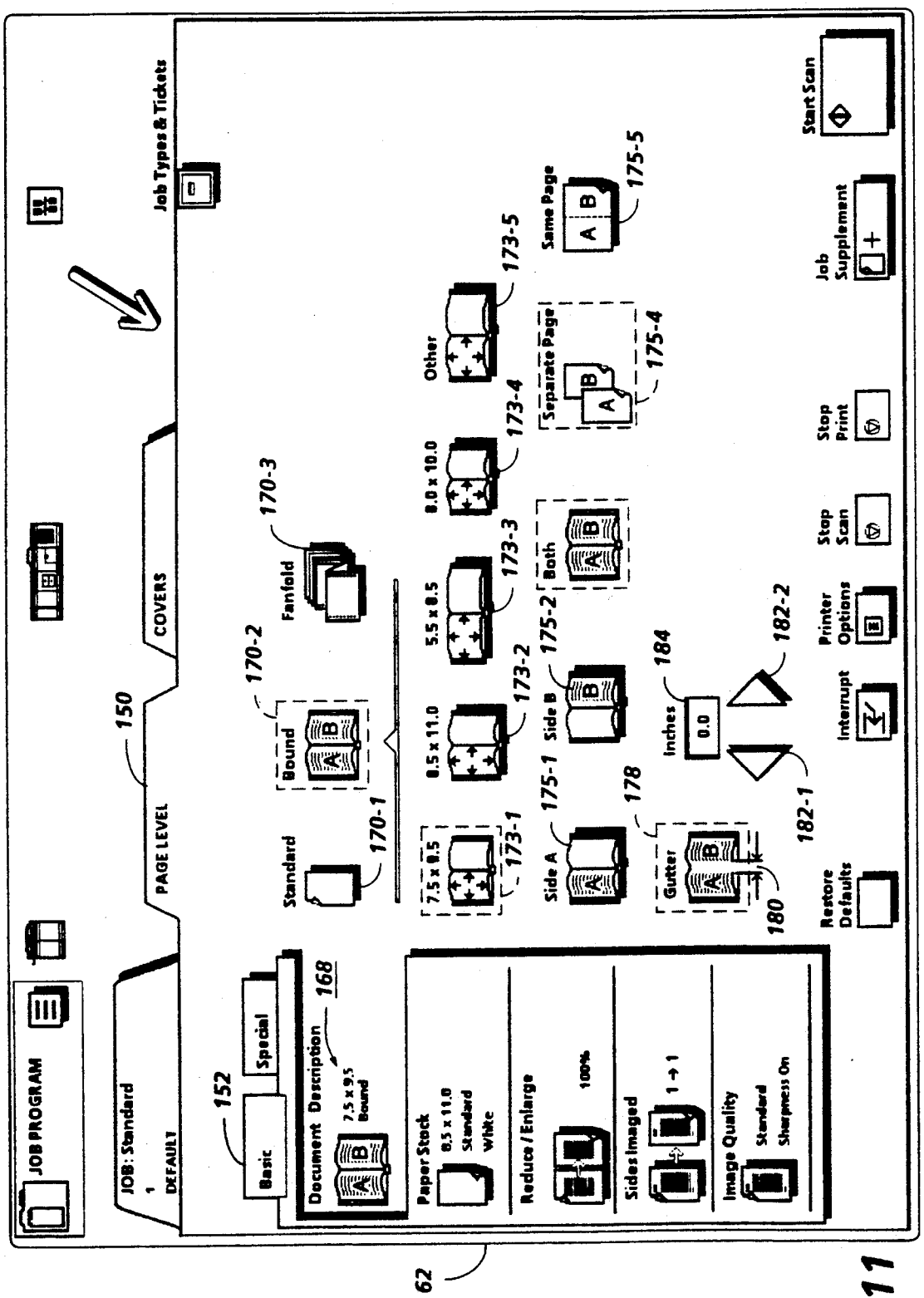
Figure 12:
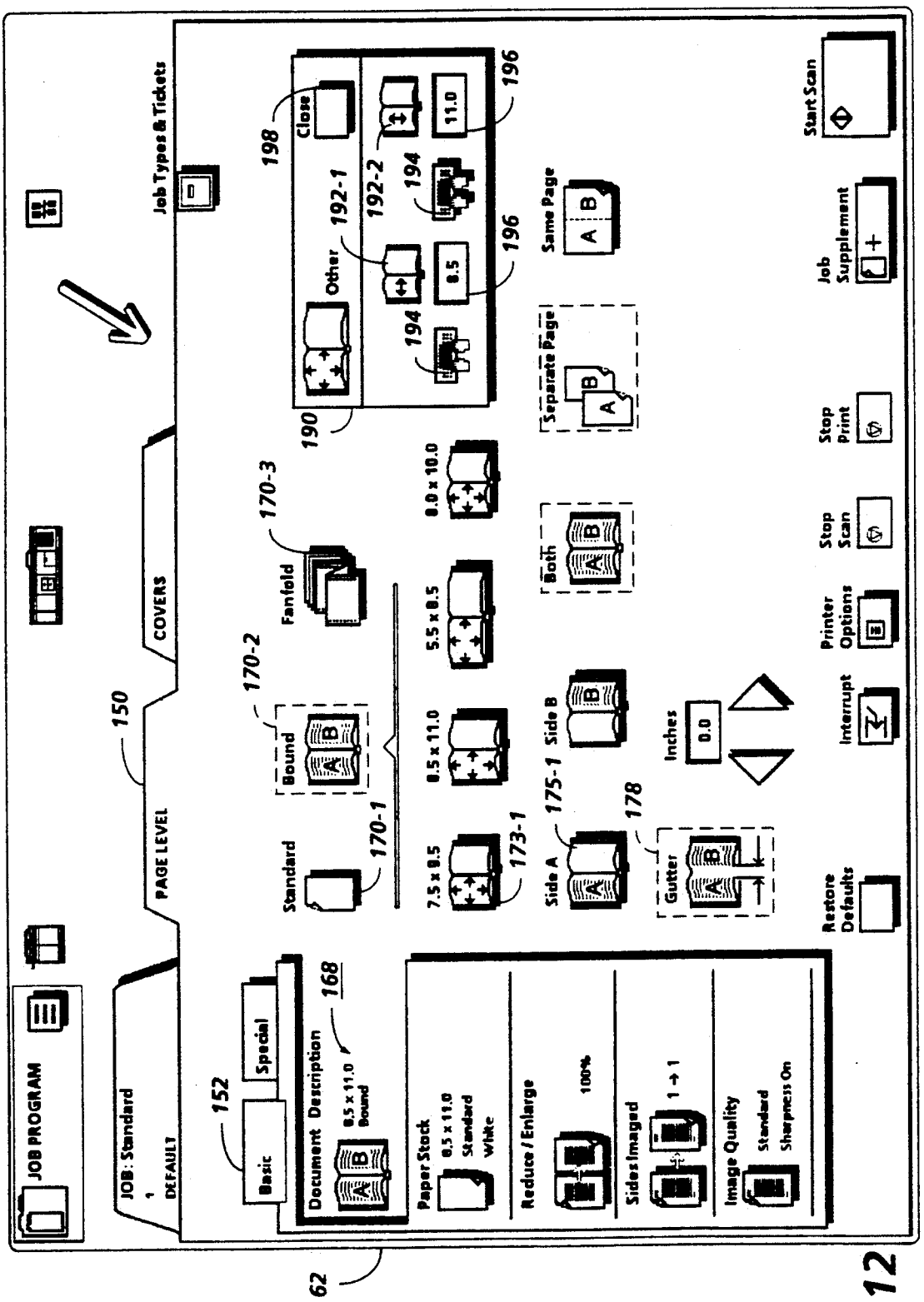
Figure 13A:
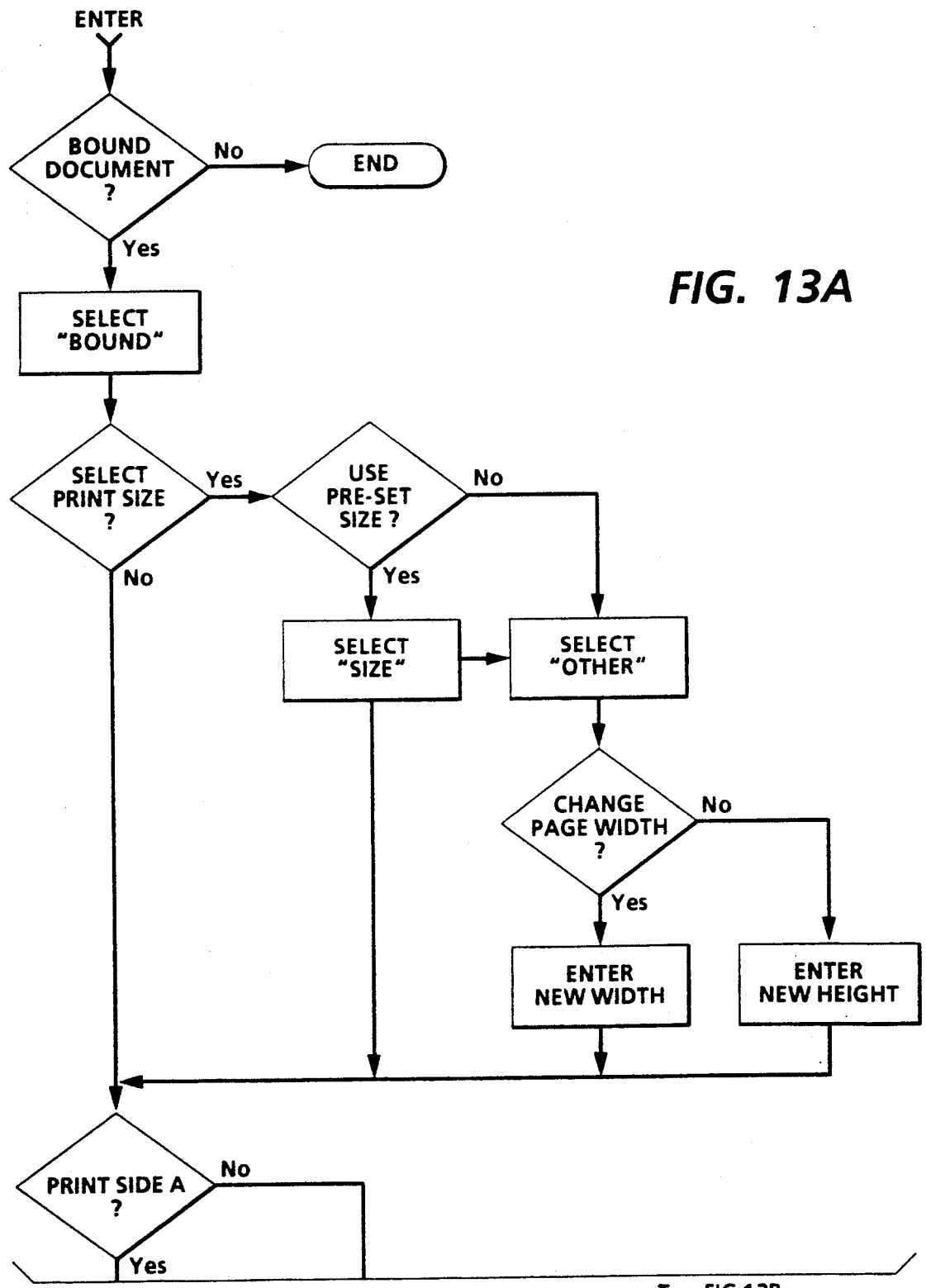
Figure 13B:
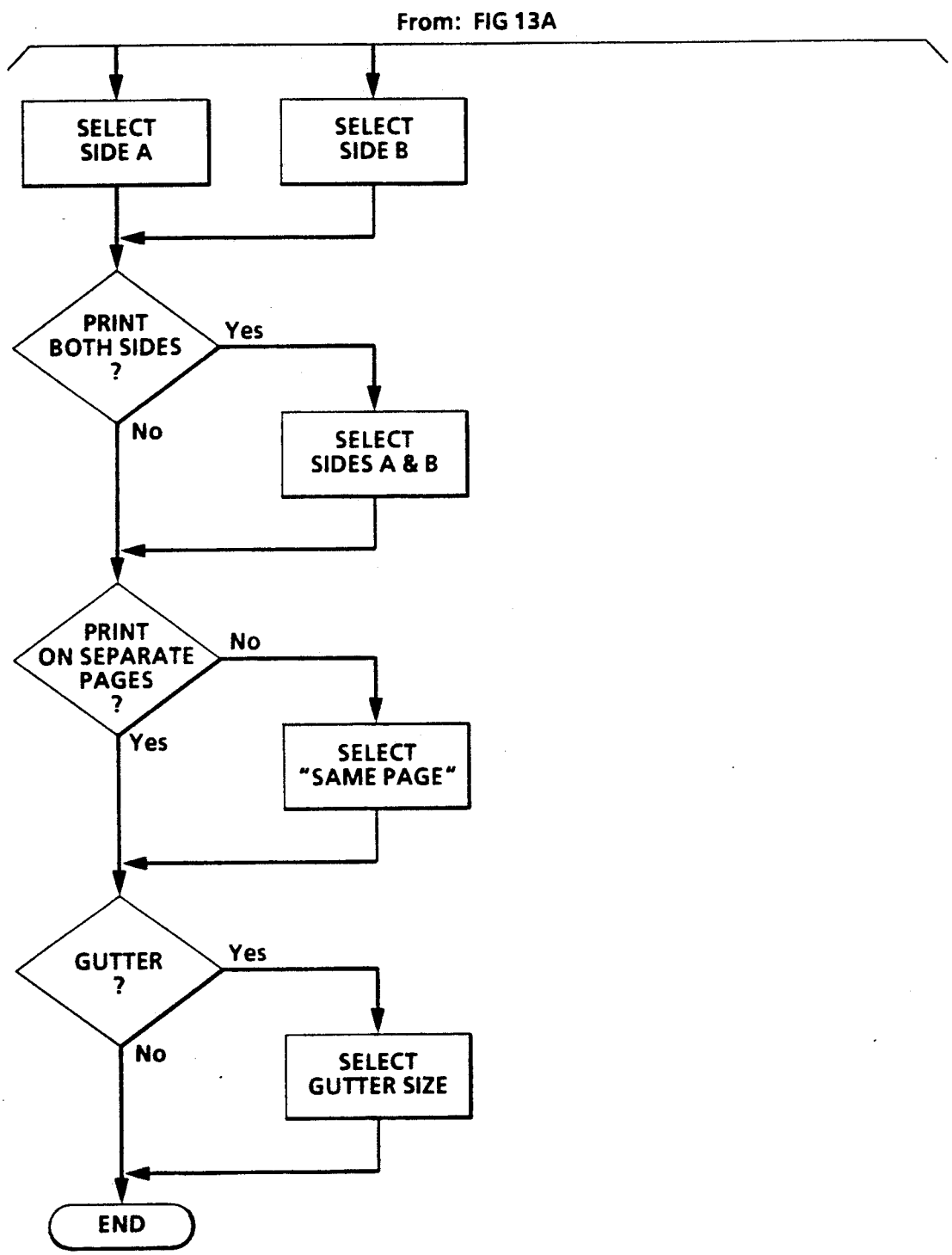

FIGS. 5A, 5B, and 5C comprise a schematic block diagram showing the major parts of the control section for the printing system shown in FIG. 1;

FIG. 6 is a block diagram of the Operating System, together with Printed Wiring Boards and shared line connections for the printing system shown in FIG. 1;

FIG. 7 is a view depicting an exemplary job programming ticket and job scorecard displayed on the User Interface (UI) touchscreen of the printing system shown in FIG. 1;

FIG. 8 is a view illustrating a reader's view of an opened bound document;

FIG. 9 is a view illustrating the bound document shown in FIG. 8 face down in registered position on the platen of a scanner prior to scanning;

FIG. 10 is a view of the UI touchscreen in which the "Basic" Scorecard for programming a bound document print job is displayed;

FIG. 11 is a view of the display following highlighting of the "Document Description" selection of the "Basic" Scorecard shown in FIG. 10 with various bound document job programming selections displayed in the touchscreen work area;

FIG. 12 is a view of the display shown in FIG. 11 following highlighting of the page size selection "Other" to display a window containing page width and height programming selections; and FIGS. 13A and 13B are flow charts showing the steps for programming a bound document print job.

Figure 2:
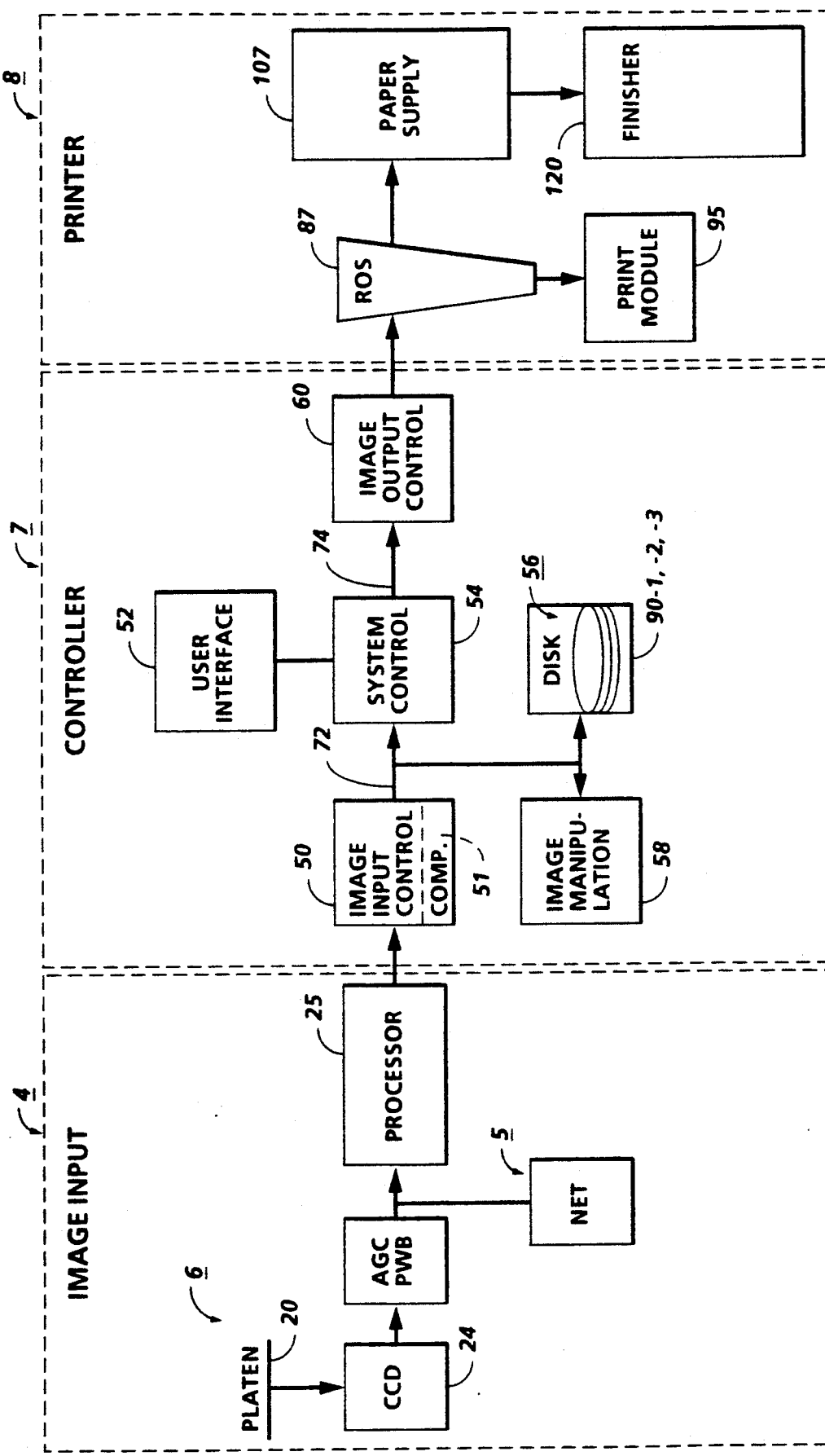
FIG. 2 is a block diagram depicting the major elements of the printing system shown in FIG. 1.

Referring to FIGS. 1 and 2, there is shown an exemplary image printing system 2 for processing print jobs in accordance with the teachings of the present invention. Printing system 2 for purposes of explanation is divided into image input section 4, controller section 7, and printer section 8. In the example shown, image input section 4 has both remote and onsite image inputs, enabling system 2 to provide network, scan, and print services. Other system combinations may be envisioned such as a stand alone printing system with on-site image input (i.e., a scanner), controller, and printer; a network printing system with remote input, controller, and printer; etc. While a specific printing system is shown and described, the present invention may be used with other types of printing systems. For example, printer section 8 may instead use a different printer type such as ink jet, ionographic, etc.

Figure 3:
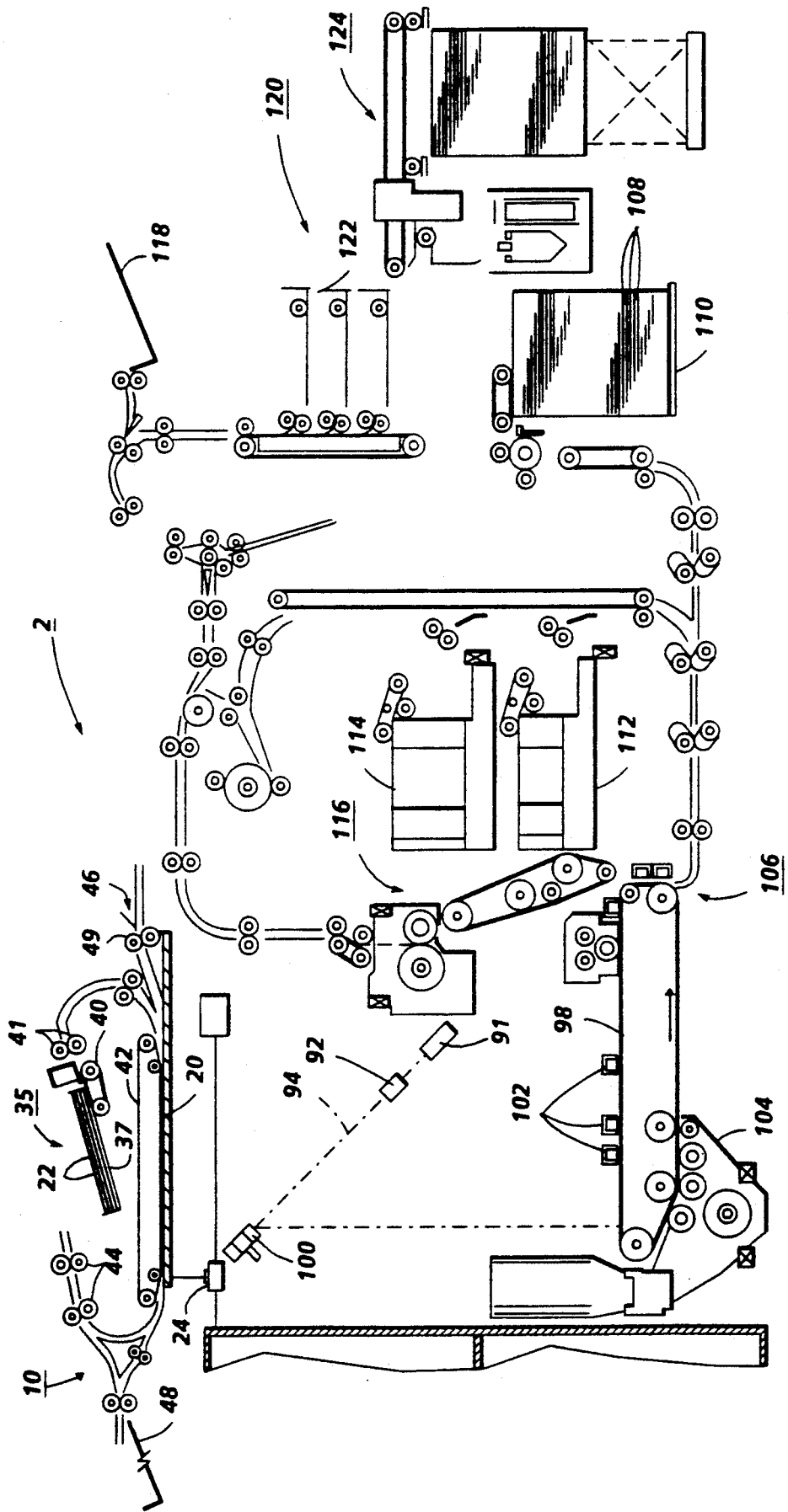
FIG. 3 is a plan view illustrating the principal mechanical components of the printing system shown in FIG. 1.
Figure 4:
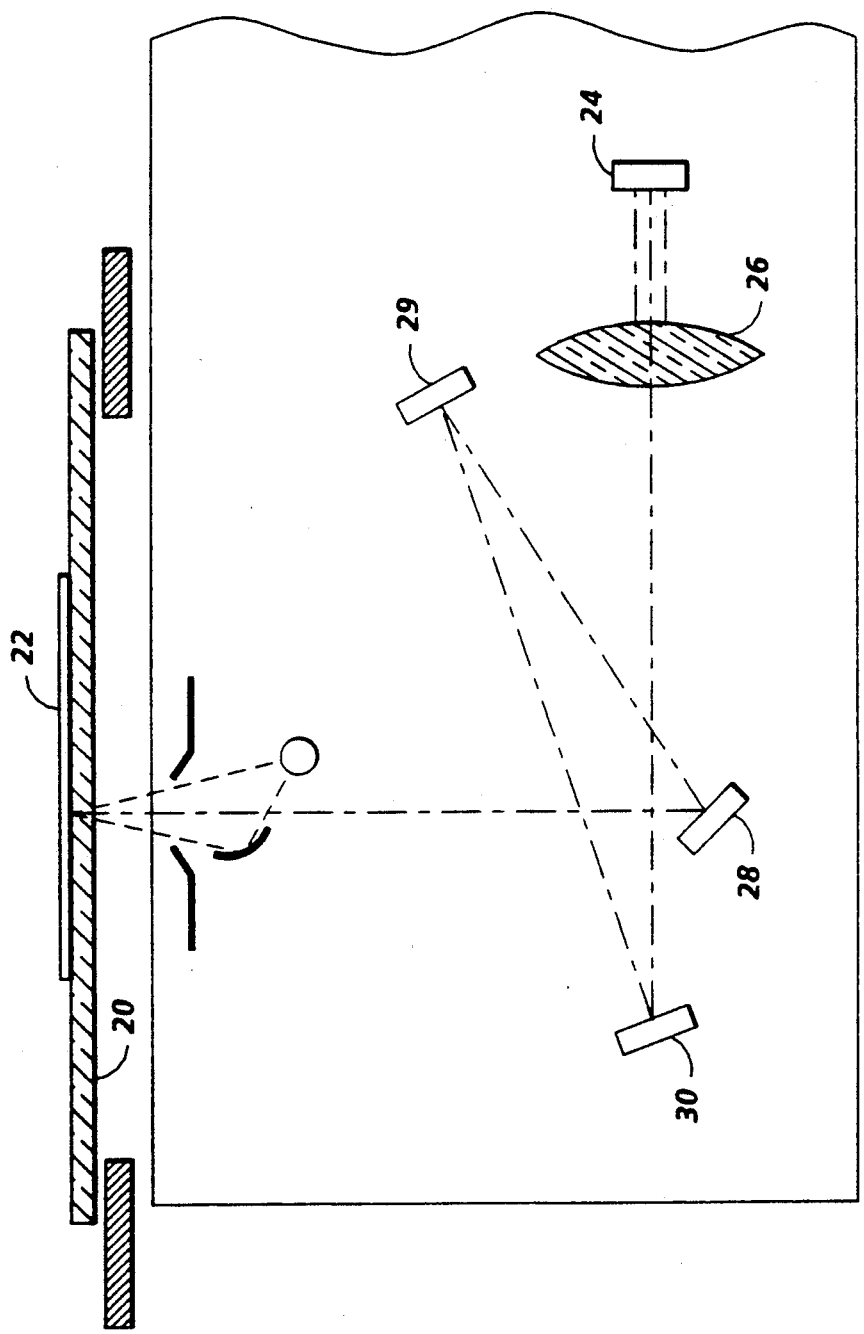
FIG. 4 is a schematic view showing certain construction details of the document scanner for the printing system shown in FIG. 1.

Referring particularly to FIGS. 2-4, for off-site image input, image input section 4 has a network 5 with a suitable communication channel such as a telephone line enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, etc. may be envisioned.

For on-site image input, section 4 has a document scanner 6 with a transparent platen 20 on which document 22 to be scanned are located. One or more linear arrays 24 are supported for reciprocating scanning movement below platen 20. Lens 27 and mirrors 28, 29, 30 cooperate to focus array 24 on a line like segment of platen 20 and the document being scanned thereon. Image data in the form of image signals or pixels from net 5 or array 24 are input to processor 25 for processing. After processing, the image signals are output to controller section 7.

Processor 25 converts the analog image signals output by array 24 to digital. Processor 25 further processes image signals as required to enable system 2 to store and handle the image data in the form required to carry out the job programmed. Processor 25 also provides enhancements and changes to the image signals such as filtering, thresholding, screening, cropping, scaling, etc.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book Mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 95 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 may comprise any of a variety of sheet sizes, types, and colors. For transfer, the print media is brought forward in timed registration with the developed image on photoreceptor 98 from either a main paper tray 110 or from auxillary paper trays 112 or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58, and image output controller 60.

Image data input from processor 25 of image input section 4 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Referring to FIG. 7, jobs are programmed in a "JOB PROGRAM" mode using touchscreen 62 and/or mouse 66. For this, there is displayed a selection of programming file cards 150 (i.e., "JOB:Standard", "PAGE LEVEL", etc). Each file card 150, when selected, displays one or more tabbed Job Scorecards 152 containing the various job programming selections available with the selected Scorecard and a Job Ticket 154 for the job. The Scorecard selections are in the form of windows with icons while the Job Ticket 154 displays three scorecard selections (i.e., "Job Level ", "Basic", and "Special"). The Job Ticket also displays the selections made to the operator. Where no selection is made, the default selection is automatically programmed and displayed on the Job Ticket. In the example shown in FIG. 7, the default selections are shown, i.e., the "JOB-Standard" file card 150, the Job Scorecard 152 for "Job Level", and Job Ticket 154 for "Account: DEFAULT".

Referring to FIGS. 8 and 9, where document 22 comprises a bound document such as a book 160, the pages 22-1, 22-2 of the book are in side-by-side relation separation by a center fold 164. For printing, the book is opened and placed face down on platen 20. As a result, two pages 22-1, 22-2 are presented each time for scanning by scanner 6. To enable bound document 160 to be located in proper position on platen 20 for scanning and insure that each page 22-1, 22-2 is completely scanned, a bound document registration mark 166 is provided along one side of the platen 20. It will be understood that the progamming selections provided by system 2 for processing images, i.e., scaling, make ready, etc., are also available to process bound documents.

Referring now to FIGS. 7 and 10-13, to program a print job in which the documents comprise bound documents 160, "PAGE LEVEL" file card 150 is accessed, displaying "Basic" scorecard 152. As seen in FIG. 10, Scorecard 152 has a series of programming selections including "Document Description" selection 168. Actuating "Document Description" selection 168 displays in an adjoining work area 158 of touchscreen 62 "Standard", "Bound" and "Fanfold" icons 170-1, 17-2, 170-3 respectively representing three different document types for processing by printing system 2.

Actuating "Bound" icon 170-2 (BOUND DOCUMENT?) displays therebelow in work area 156 a series of selections in the form of icons 173-1, 173-2, 173-3, 173-4, 173-5 for selecting the bound document print sizes (SELECT PRINT SIZE?), a series of print programming selection icons 175-1, 175-2, 175-3 to select printing of one side or the other side, (i.e., PRINT SIDE A?), or both sides (PRINT BOTH SIDES?) page selection icons 175-4, 175-5 to select printing on one page or two pages (PRINT ON SEPARATE PAGES?), and a "Gutter" icon 178 (GUTTER?) for programming the size of the gutter 180 on either side of center fold 164 if desired.

Print size programming icons 173-1, 173-2, 173-3, 173-4 provide preset print sizes (USE PRE-SET SIZES?) such as "8.5×11" for pages 22-1 22-1 of the bound document 160. Certain industry standard book sizes may be pre-programmed for icon selection also, thereby avoiding the need to input actual size. "Other" icon 173-5 (SELECT OTHER) permits a different or custom print size to be programmed as will appear. In the example shown in FIG. 11, "7.6×9.5" print size icon 173-1 selected.

Print programming icons 175-1, 175-2, 175-3 are used to program printer 8 to printer either page 22-1 of bound document 160 (PRINT SIDE A?), page 22-1 (SELECT SIDE B), or both pages 22-1, 22-2 (PRINT BOTH SIDES?). "Separate Pages" icon 175-4 is used to program printer 8 to print pages 22-1, 22-2 on separate or individual sheets of print media 108 (PRINT ON SEPARATE PAGES?) while "Same Page" icon 175-5 is used to program printer 8 to printer pages 22-1, 22-2 on the same print media page (SELECT SAME PAGE). Icons 175-4, 175-5 are not enable for selection where either "Side A" icon 175-1 or "Side B" icon 175-2 have been selected. In the example shown in FIG. 11, "Both" icon 175-3 and "Separate Pages" icon 175-4 have been selected to program printer 8 to print both pages 22-1, 22-2 of bound document 160 on separate sheets of print media 108.

Where it is desired to block out and not print a part of the page 22-1, 22-2 next to fold line 164, referred to as a gutter 180, "Gutter" icon 178 is actuated. This enables left and right scrolling icons 182-1, 182-2 respectively. A gutter size display window 184 displays the size of the gutter 180 programmed. By selectively actuating scrolling icons 182-1 and 182-2, the size of gutter 180 is programmed (SET GUTTER SIZE), with the gutter size selected displayed to operator in window 184.

Referring now particularly to FIG. 12, where it is desired to program a print size other than the standard sizes displayed by icons 173-1, 173-2, 173-3, 173-4, "Other" icon 173-5 is actuated (SELECT OTHER). Actuation of icon 173-5 causes a window 190 to be displayed in work area 158 having horizontal and vertical print size icon selections 192-1, 192-2 respectively. Each icon 192-1, 192-2 has a combination keyboard icon 194-1, 194-2 and print size window 196 displayed therebelow. A "Close" button 198 is provided for closing window 190.

Where for example it is desired to change the print size of one or both of the bound document pages 22-1, 22-2 along the horizontal axis (CHANGE PAGE WIDTH?), icon 192-1 is actuated to highlight the keyboard icon 194-1 and print size window 196 associated therewith. Highlighting of keyboard icon 194-1 enables programming input from keyboard 194-1. Using keyboard 64, the operator programs in the print size desired (ENTER NEW WIDTH). As the print size is changed, the changed size is displayed in window 196.

Similarly, where it is desired to change print height, icon 192-2 is actuated to highlight keyboard icon 194-2 by using keyboard 194-2, the height of the print is programmed (ENTER NEW HEIGHT).

The print media 108 (i.e., Paper Stock) on which the bound document pages 22-1, 22-2 are to be printed is preset to "8.5 × 1.0—Standard-White". Where a different size media 108 is desired, "Paper Stock" icon 199 is selected to display a series of paper stock size, type, and color selections (not shown). Following selection of the desired print media, the system will automatically fit the bound document to the print media selected.

While the invention has been described with reference to the structure disclosed, it is not confined to the details set forth, but is intended to cover such modifications or changes as may come within the scope of the following claims.

We claim:

1. A process for printing the pages of a bound document in a printing system having a scanner with platen for scanning the pages of bound documents placed on said platen and converting the pages to image signals, and a printer for producing prints of said pages from said image signals, the pages of the bound document having two discrete image sides with a foldline therebetween, comprising the steps of:
   a) programming said scanner
      1) to scan one or both of said image sides of said bound document pages, and
      2) to provide an image signals representative of a generally rectangular area of preset size on each image side scanned for deletion with one boundary of said rectangular area being bounded by said fold line;
   b) placing said bound document with one of said bound document pages to be printed on said platen;
   c) using said foldline to register said page on said platen for scanning;
   d) actuating said scanner to scan said page and provide image signals representative of the image side or sides scanned;
   e) storing said image signals;
   f) repeating steps b-e for each additional page of said bound document to be printed;
   g) for printing,
      1) deleting the image signals representative of said rectangular area from the image signals representative of each of said image sides so that on printing by said printer, said rectangular area of each of said image sides is not printed, and
      2) inputting said image signals from step g1 representative of one or both of said image sides of each page of said bound document from said memory to said printer;
   h) actuating said printer to produce a print of said pages from the image signals in step g1; and
   i) repeating step h until the desired number of prints of the pages of said bound document are made.

2. The process according to claim 1 including the step of:
   when printing both said image sides, printing said image sides for each of said pages of said bound document on a single sheet of print media.

3. The process according to claim 1 including the step of:
   when printing both of said image sides, printing said image sides for each of said pages of said bound document on a separate sheet of print media.

4. A process for making prints of a bound document having pages with discrete first and second sides and a foldline therebetween in a printing system, said printing system having a scanner for selectively converting one or both of said first and second sides of said pages of image signals, and a printer for producing prints from said image signals, said scanner including a platen for supporting said pages for scanning, comprising the steps of:
   a) opening said bound document to a page and placing said opened bound document face down on said platen whereby to position the first and second sides of said page for scanning;
   b) aligning said foldline of said page with a registration mark on said scanner to locate said first and second sides of said page in registered position on said platen for scanning;
   c) programming a gutter dropout comprising a preset gutter image on each of the first and second sides of said bound document bordering said foldline for deletion;
   d) selectively scanning either one or both of said first and second sides of said page to provide image signals representative of either one or both of said first and second sides of said page, a part of said image signals of each side being representative of said gutter image;

e) storing said image signals for pending use by said printer;

f) repeating steps a-e for each remaining page of said bound document to be printed; and g) on printing,
1) deleting said part of said image signals representing the gutter image from said image signals representative of either one or both of said first and second sides of each page prior to printing, and
2) using the remainder of said image signals to print said first, second, or both of said first and second side of each page without said gutter image a preset number of times to make prints of said bound document.

5. The process according to claim 4 including the step of:
   printing both said first and second side of each page of said bound document on a single sheet of print material.

6. The process according to claim 4 including the step of:
   printing each of said first and second side of each page of said bound document on an individual sheet of print material.

* * * * *